United States Patent [19]
Carlson et al.

[11] 3,718,731
[45] Feb. 27, 1973

[54] PROCESS FOR RECOVERING AMMONIA FROM A GASEOUS MIXTURE CONTAINING NH3 AND HCN

[75] Inventors: Harrison Cornforth Carlson, Newark, Del.; Wayne Thomas Hess, Memphis, Tenn.

[73] Assignee: E. I. du Pont de Nemours and Company, Wilmington, Del.

[22] Filed: Oct. 26, 1970

[21] Appl. No.: 83,727

[52] U.S. Cl..................................423/238, 423/236
[51] Int. Cl..............................C01c 1/12, C01c 3/04
[58] Field of Search..........................23/196, 2 R, 151

[56] References Cited

UNITED STATES PATENTS

| | | | |
|---|---|---|---|
| 2,797,148 | 6/1957 | Carlson | 23/196 |
| 2,912,301 | 11/1959 | Schreiner et al. | 23/2 R |

OTHER PUBLICATIONS

"Catalyzed Scrubbing Improves Gas Cleanup," Chemical Engineering, Nov. 26, 1962, pp 60 and 62.

*Primary Examiner*—Oscar R. Vertiz
*Assistant Examiner*—Hoke S. Miller
*Attorney*—Robert W. Black

[57] ABSTRACT

An improved process of recovering ammonia from a mixture of gases containing ammonia and hydrogen cyanide is provided. In the process, substantially all of the ammonia and a minor portion of hydrogen cyanide are absorbed in an aqueous solution of ammonium hydrogen phosphate in an absorbing zone, the resulting solution is passed into a hydrogen cyanide removal zone so as to remove absorbed hydrogen cyanide and only a minor proportion of absorbed ammonia, the substantially hydrogen cyanide free solution is passed into a stripping zone to remove the remaining available ammonia, and then the stripped ammonia is collected. The improvement in this process comprises removing the solution from the stripping zone in two streams such that one stream is leaner in ammonia than the second stream and passing both streams to the absorbing zone at a temperature within the range of 40°–70° C., the stream leaner in ammonia passed into the absorbing zone at a point where most of the ammonia has been absorbed.

4 Claims, 1 Drawing Figure

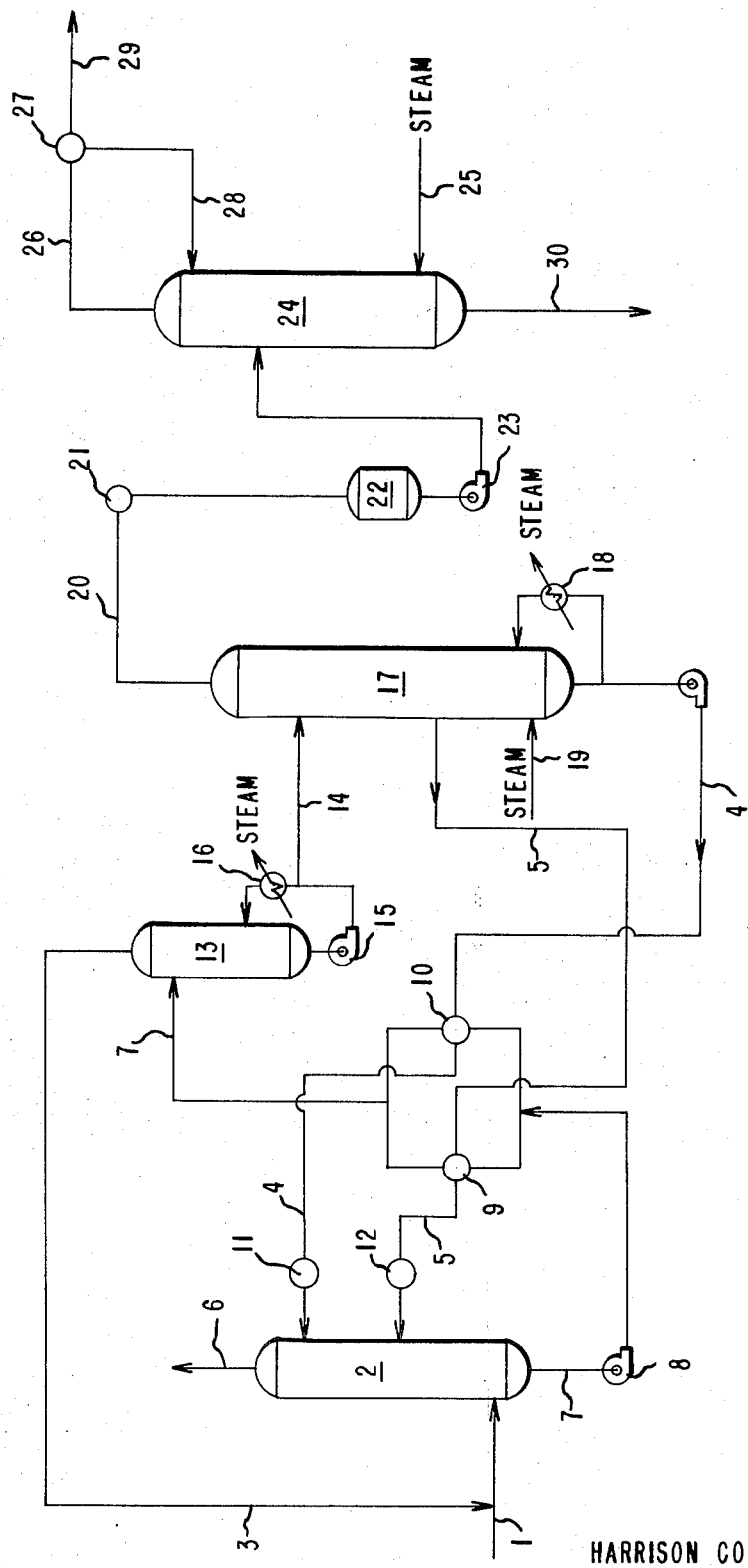

3,718,731

PROCESS FOR RECOVERING AMMONIA FROM A GASEOUS MIXTURE CONTAINING NH3 AND HCN

BACKGROUND OF THE INVENTION

1. Field of the Invention

This invention relates to processes for the recovery of ammonia from gases containing ammonia and hydrogen cyanide. More particularly, this invention relates to improvements in such processes by the recirculation of aqueous solutions of ammonium hydrogen phosphate.

2. Prior Art

Within the past few decades, ammonia has been recovered form gaseous mixtures containing hydrogen cyanide and ammonia by absorbing the ammonia in an aqueous solution of mono-ammonium hydrogen phosphate ($NH_4H_2PO_4$) and di-ammonium hydrogen phosphate (($NH_4)_2HPO_4$) corresponding to an $NH_4^+/PO_4^=$ ratio of about 1.3 or of approximate formula $(NH_4)_{1.3}H_{1.7}PO_4$. The solution absorbs a preponderance of the ammonia and a minor part of the hydrogen cyanide. The ammonium phosphate is enriched in ammonia content by formation of more di-ammonium hydrogen phosphate corresponding to a formula of about $(NH_4)_{1.9}H_{1.1}PO_4$. The solution is then stripped by live steam, first of hydrogen cyanide which is returned to the absorber and then of ammonia to the corresponding lower $NH_4^+/PO_4^=$ ratio and returned back to the absorber. The $NH_3-H_2O$ gas stream leaving the top of the ammonia stripper is condensed and fed to an ammonia enriching column. Such a process is described in U.S. Pat. No. 2,797,148 issued in the name of Harrison C. Carlson on June 25, 1957. The process conditions disclosed in this patent make the practical application quite difficult and, indeed, economically penalizing. This results from an unfavorable curvature of the equilibrium line associated with the ammonia stripping operation, requiring an abnormally high vapor rate (stripping steam) to achieve the $NH_4^+/PO_4^=$ ratio of 1.3. As a result, an economic balance between the cost of stripping steam and degree of stripping results in stripping to an $NH_4^+/PO_4^=$ ratio only approaching a ratio of 1.3. Thus, the stripped aqueous stream of ammonium hydrogen phosphate which is returned to the absorber top for absorbing more ammonia is in practice already quite rich in ammonia and its efficiency to absorb the ammonia is greatly decreased. This permits a more substantial amount of ammonia to leave the ammonia absorber with the hydrogen cyanide gas than would be predicted, resulting in excessive use of acid in the hydrogen cyanide recovery facilities downstream to prevent polymerization of the hydrogen cyanide. The resulting ammonium salt of the acid (normally ($NH_4)_2SO_4$) must be purged and further treated prior to discarding as waste to prevent pollution of the waste-receiving stream with $NH_4^+$ and $SO_4^=$. Also, the rich ammonium hydrogen phosphate solution leaving the ammonia absorption tower will now contain a substantially higher $NH_4^+/PO_4^=$ ratio than the preferred ratio of 1.8. This results in a more alkaline solution (e.g., pH greater than 8.0) and results in polymerization of most of the hydrogen cyanide that is absorbed in this solution. Thus, the hydrogen cyanide recovery is less effective.

SUMMARY OF THE INVENTION

According to the present invention there is provided an improved process of recovering ammonia from a mixture of gases containing ammonia and hydrogen cyanide wherein substantially all of the ammonia and a minor portion of hydrogen cyanide are absorbed in an aqueous solution of ammonium hydrogen phosphate in an absorbing zone, the resulting solution is passed into a hydrogen cyanide removal zone so as to remove absorbed hydrogen cyanide and only a minor proportion of absorbed ammonia, the substantially hydrogen cyanide-free solution is passed into a stripping zone to remove the remaining available ammonia, and then the stripped ammonia is collected, and in which the improvement comprises: removing the solution from the stripping zone in two streams such that one stream is leaner in ammonia than the second stream and passing both streams to different points of the absorbing zone at a temperature within the range of 40°–70° C., the stream leaner in ammonia passed into the absorbing zone at a point where most of the ammonia has been absorbed.

BRIEF DESCRIPTION OF THE DRAWING

The drawing is an illustrative flow diagram of the process of the present invention.

DETAILED DESCRIPTION OF THE INVENTION

Referring to the drawing, hydrogen cyanide and ammonia in a gaseous stream from a hydrogen cyanide production unit or other source enters into an absorption tower 2 through line 1 at a temperature in the range of 50°–90° C. Another gaseous stream 3 from the hydrogen cyanide stripper column 13 which contains hydrogen cyanide, water vapor and some ammonia at a temperature in the range of 90°–120° C., depending on pressure and composition in stripper 13, combines with stream 1 at the feed point to absorption tower 2. The gases flow up through the tower 2 countercurrent to the downward-flowing aqueous solution of ammonium hydrogen phosphates containing 30–35 percent by weight of the ammonium salt and out the top through line 6.

The aqueous solution of ammonium hydrogen phosphates enter the absorption tower 2 at two positions and at different $NH_4^+/PO_4^=$ ratios. The first of these is at the top through line 4. This stream which represents 25–40 percent of the total liquid is fed at a temperature of 40°–70° C. and has an $NH_4^+/PO_4^=$ ratio of 1.2–1.4; e.g., $(NH_4)_{1.2-1.4}H_{1.8-1.6}PO_4$. This cold, ammonia-lean solution, which comes from the base of the ammonia stripper 17, provides the absorption driving force to reduce the ammonia content of the ammonia and hydrogen cyanide containing gas stream passing up absorber 2 to levels previously not economically achievable. The second part of the phosphate solution enters the absorber 2 through line 5 at an $NH_4^+/PO_4^=$ ratio of 1.45–1.65, preferably 1.5–1.6, and at a temperature of 40°–70° C. The feed point, approximately half way down absorber column 2, is picked to match the increased ammonia concentration of the phosphate liquor flowing from the upper zone so as not to upset the ammonia balance in the column. The bulk of the ammonia is absorbed in the lower zone of column 2

(e.g., from the second feed point down) while the upper zone (between the upper and lower feed points) provides cleanup. It is preferred that the temperature of the two returning solution streams 4 and 5 be within the range of 40° C. up to 55° C. since operation at the higher temperatures results in the recirculation of large quantities of solution in order to maintain column temperatures and efficiency. The absorber 2 is normally operated between 1 and 2 atmospheres pressure and a temperature of 70°-80° C., which represents a balance between more favorable ammonia absorption and minimizing hydrogen cyanide absorption.

The combined ammonium hydrogen phosphate stream leaves the absorber 2 at the base through line 7. The stream is now enriched in ammonia corresponding to an $NH_4^+/PO_4^\equiv$ ratio of 1.7–2.0 or $(NH_4)_{1.7-2.0}H_{1.3-1.0}O_4$. This enriched stream is pumped by pump 8 through parallel heat exchangers 9 and 10, in which the stream is preheated to 100°-110° C. by the returning lean streams 4 and 5 and is fed to the hydrogen cyanide stripping column 13.

The stripping column 13 is operated at just sufficient pressure to enable the stripped gases leaving in line 3 to re-enter absorption column 2. In this column the preponderance of the hydrogen cyanide which was absorbed in the phosphate liquor is removed along with a minor amount of ammonia and water. Stripping can be accomplished by either live steam or by reboiler 16. The latter is preferred in order to maintain a water balance in the system. A portion of the bottoms stream 14, which has been stripped of hydrogen cyanide, is pumped by pump 15 to the top of the ammonia stripping column 17 and a portion is circulated through reboiler heat exchanger 16 to provide column boilup. Stream 14 will be at a temperature of 110°-120° C., depending on operating pressure and composition within hydrogen cyanide stripper 13.

The ammonia stripping column 17 removes the remaining hydrogen cyanide from the phosphate liquor, all of the ammonia that has been absorbed in the absorber 2 and water which condensed during the absorption cycle. The feed stream 14 has an $NH_4^+/PO_4^\equiv$ ratio of 1.65–1.95, preferably less than 1.85. The column is operated at 1–2.5 atmospheres pressure, preferably about 2 atmospheres. This gives a favorable spread between the equilibrium curve and minimum required operating line. Since the equilibrium line has an adverse curvature resulting in a pinched zone compared to the operating line at liquor concentrations corresponding to $NH_4^+/PO_4^\equiv$ ratios of 1.5–1.65, this situation can be improved by greatly increasing the column vapor rate. Thus, the slope of the operating line at the expense of increased steam requirement at 18 and 19 minimizes the ammonia concentration in the overhead vapor. If this is done, steam costs are greatly increased in stripper 17 and also in the enriching column 24 down stream since the concentration of ammonia in overhead line 20 is greatly decreased, resulting in a more difficult enriching step. The preferred method of operating stripper 17 is to maintain the more reasonable vapor rate, but to remove 60–75 percent of the liquor partway down the column through line 5 when its $NH_4^+/PO_4^\equiv$ ratio is approaching the pinched zone concentrations; e.g., 1.45–1.65. By so doing this, the slope of the operating line is automatically reduced and a favorable spread between the equilibrium line and operating line results in the lower part of the column. When this is done, the operating line bends with the equilibrium line permitting stripping down to a 1.2–1.4 $NH_4^+/PO_4^\equiv$ ratio with the same vapor rate (steam) which could only achieve stripping down to a 1.5 $NH_4^+/PO_4^\equiv$ ratio. Removal of more of the liquor at line 5 results in stripping to the lower $NH_4^+/PO_4^\equiv$ ratio. The phosphate liquor not removed at line 5, which is 25-40% of the total phosphate liquor stream, leaves the ammonia stripper at the bottom through line 4 after having been stripped to the lower (1.2–1.4) $NH_4^+/PO_4^\equiv$ ratios as described above.

The vapor rate required for stripping is provided in two places; reboiling in heat exchanger 18 and introduction of live steam through line 19, with the bulk of the stripping vapor provided by the live steam. At normal operating conditions of 2.0 atmospheres, the overhead vapor temperature leaving in line 20 will be between 115° and 125°C., the liquor exiting at line 5 will be at a temperature of about 120°-130° C., and the bottoms liquor in line 4 will be slightly higher in temperature, i.e., within the range of 125°-135° C. Streams 4 and 5 are returned to absorber 2 as previously described.

The overhead vapors containing ammonia are totally condensed in condenser 21, collected in tank 22, and pumped by pump 23 to the ammonia enriching column 24. Several plates are provided in column 24 to enrich the ammonia content such that the overhead vapors at 105°-110° C. and 3 atmospheres pressure leave through line 26 and will contain at least 60 percent by volume of ammonia. The vapors are partially condensed in condenser 27, leaving an enriched vapor in line 29 containing up to 90 percent by volume ammonia at about 80° C. for return back to the main process or other use. Reflux is returned to the top of the column through line 28. Live steam is introduced at the bottom of the enriching column through line 25 to provide column boilup and in sufficient quantity to produce a nearly pure water stream exiting the column through line 30.

What is claimed is:

1. In the process of recovering ammonia from a mixture of gases containing ammonia and hydrogen cyanide wherein substantially all of the ammonia and a minor portion of hydrogen cyanide are absorbed in an aqueous solution of ammonium hydrogen phosphate in an absorbing zone, the resulting solution is passed into a hydrogen cyanide removal zone so as to remove absorbed hydrogen cyanide and only a minor proportion of absorbed ammonia, the substantially hydrogen cyanide-free solution is passed into a stripping zone to remove the remaining available ammonia, and then the stripped ammonia is collected, the improvement comprising: (1) removing the solution from the stripping zone in two streams, one stream ammonia-lean and comprising 25 to 40 percent of the solution removed from the stripping zone and the second stream ammonia-rich and comprising 75 to 60 percent of the solution removed from the stripping zone, said ammonia-lean stream having a ratio of ammonia to phosphate within the range of 1.2 to 1.4 and the ammonia-rich stream having a ratio of ammonia to phosphate within the range of 1.45 to 1.65, (2) passing the ammonia-lean stream at a temperature within the range of 40° to 70° C. into the absorbing zone at the upstream end of the flowing gases and (3) passing the ammonia-rich stream at a temperature within the range of 40° to 70° C. into the absorbing zone at the point where the stream and the solution in the absorbing zone have essentially the same ratios of ammonia to phosphate.

2. The process of claim 1 wherein the absorbing zone is operated at a pressure within the range of 1 to 2 atmospheres and the stripping zone is operated at a pressure within the range of 1 to 2.5 atmospheres.

3. The process of claim 2 wherein the temperature of the ammonia-lean stream and the temperature of the ammonia-rich stream is within the range of 40° C. up to 55° C.

4. The process of claim 3 wherein the ammonia-rich stream has a ratio of ammonia to phosphate within the range of 1.5 to 1.6.

* * * * *